July 23, 1940.    J. COWIN    2,209,073
CORNCRIB
Filed Sept. 19, 1938    2 Sheets-Sheet 1
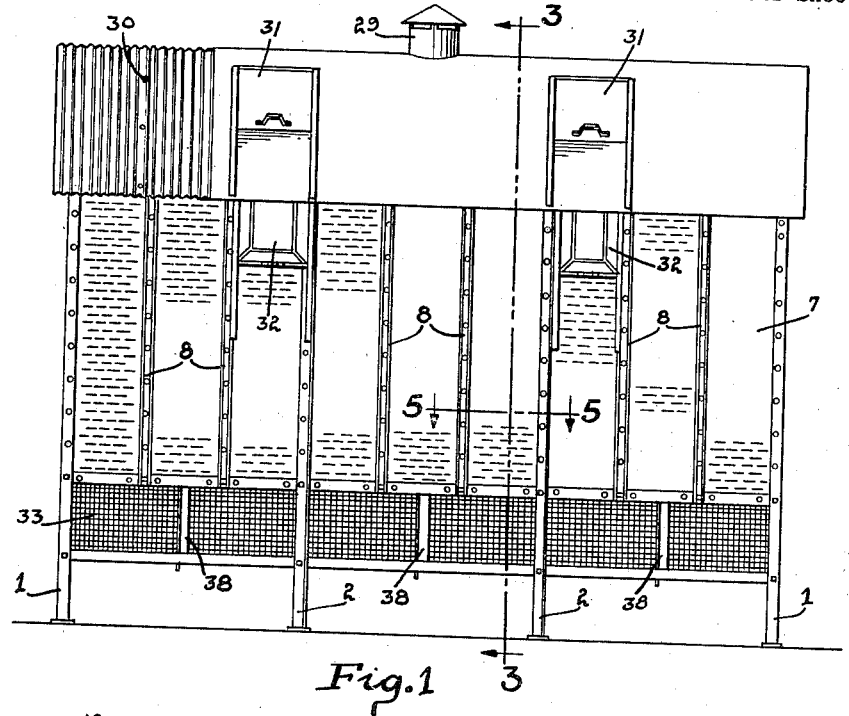
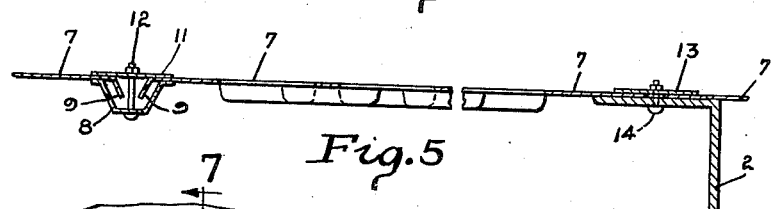
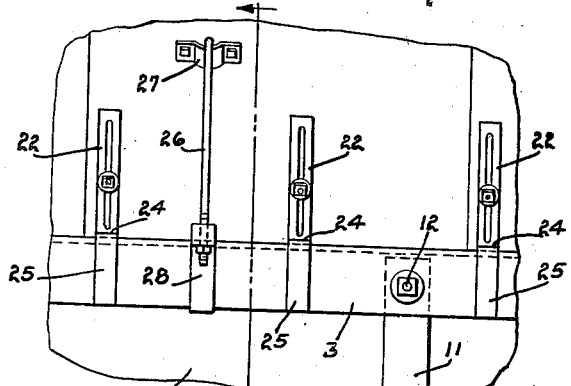
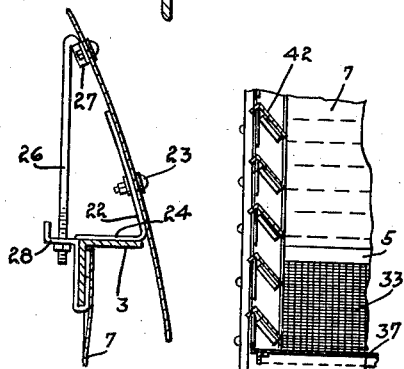
INVENTOR
JAMES COWIN
BY
ATTORNEYS July 23, 1940.  J. COWIN  2,209,073
CORNCRIB
Filed Sept. 19, 1938  2 Sheets-Sheet 2
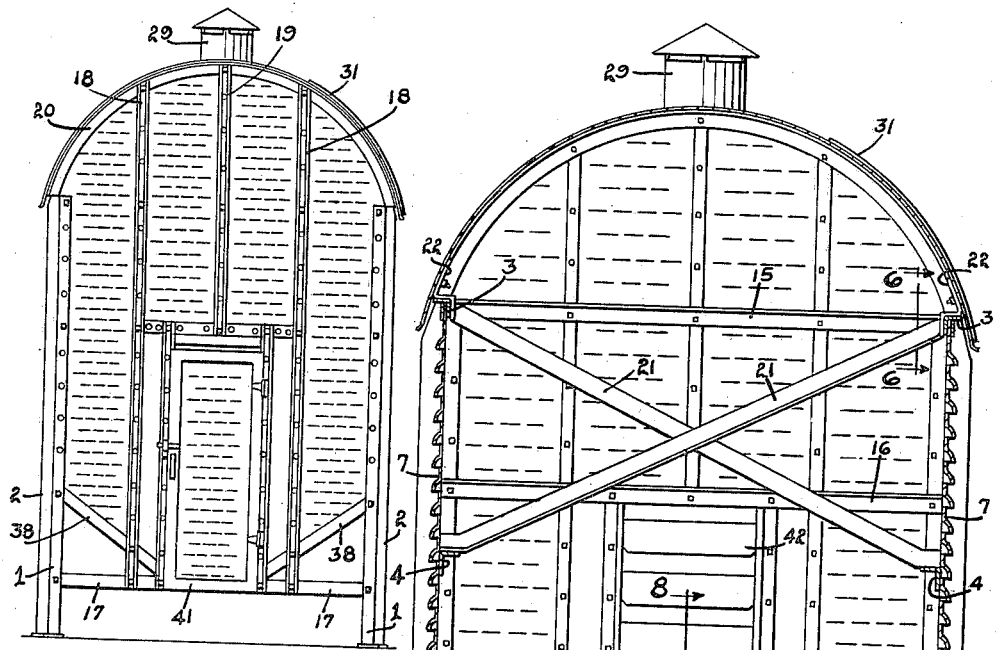
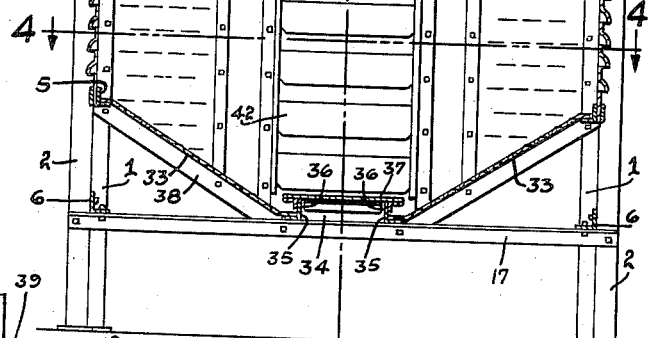
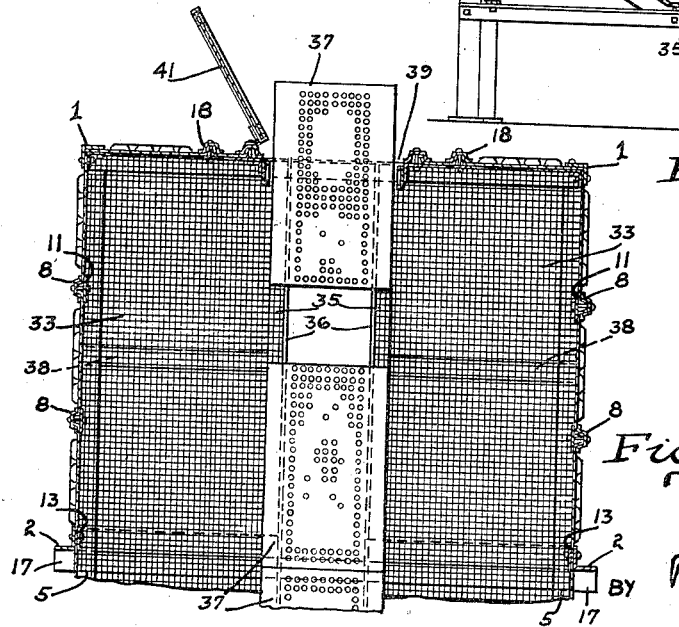
INVENTOR
JAMES COWIN
ATTORNEYS Patented July 23, 1940

2,209,073

UNITED STATES PATENT OFFICE 2,209,073

CORNCRIB

James Cowin, Minneapolis, Minn., assignor to Cowin and Company, Minneapolis, Minn., a corporation of Minnesota Application September 19, 1938, Serial No. 230,652

5 Claims. (Cl. 130—3)

This invention relates to new and useful improvements in corncribs.

Corncribs, as now commonly constructed, are not always sufficiently well ventilated to adequately preserve the corn, when the ear corn is initially placed in the crib after harvest. Because of the relatively high moisture content of the corn, when harvested, it is of utmost importance that the ear corn be stored in a dry, well ventilated place, in order to prevent it from heating and molding, which it is very likely to do, if the crib is not adequately ventilated. The crib should be so constructed as to permit free circulation of air throughout the entire interior thereof, so that all of the corn or contents of the crib is sufficiently aerated or ventilated, so that the moisture in the corn may be carried off. When the corn is thus thoroughly ventilated, while stored in the crib, it may readily be dried and cured to provide a high grade corn having a relatively high germinative rating. It is also essential that the walls of the crib be so constructed that rain and snow will not enter the crib in such a manner as to damage the corn, and the crib must also be so constructed as to prevent rodents and other vermin from entering. Cribs designed for storing corn are sometimes relatively large in size, and it is therefore desirable that such cribs be provided with means whereby the corn or contents thereof may readily be removed from the crib with a minimum of effort.

The novel corncrib herein disclosed, has been designed to meet all of the requirements of a highly efficient and practical storage structure for corn and other materials to which it may be applicable.

An object of the present invention, therefore, is to provide a corncrib wherein all of the objectionable features now commonly present in conventional corncribs have been eliminated.

A further object is to provide an all-metal corncrib which is very rigid and substantial in construction, and which has means in its upper portion to facilitate loading it, and also having means embodied in the bottom thereof to facilitate removing the contents therefrom.

A further object is to provide an all-metal corncrib, the walls of which are provided with closely spaced, horizontally disposed louvres, which permit free air circulation therethrough, and having a hopper bottom provided with an elongated discharge opening normally closed by suitable slide doors, which doors may readily be operated from one end of the crib to discharge the contents therefrom.

A further object resides in the novel construction of the roof, which is made of curved sheets which preferably are corrugated, although not necessarily, having their contiguous edges overlapped and suitably secured together, and having their lower edges suitably supported on opposed walls of the crib in such a manner that no rafters are required to support the roof.

Other objects of the invention reside in the general construction of the crib; in the manner of securing together the end and side walls and the semi-cylindrical roof; in the construction of the hopper bottom, the side walls of which are composed of wire mesh to permit maximum air circulation therethrough; in the construction and novel arrangement of the horizontally disposed slide doors in the hopper bottom, which also are perforated, whereby air may circulate freely through the entire bottom of the crib; in the construction of the door, and the means provided in the door opening for preventing the corn or contents of the crib from discharging through the door opening, when the door is opened; and, in the constructional details of the crib, whereby it may be manufactured in quantity production at small cost, and whereby it is extremely inexpensive to maintain.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a view showing a side elevation of my novel corncrib;

Figure 2 is an end view of Figure 1;

Figure 3 is a vertical sectional view on the line 3—3 of Figure 1, showing the louvres in the walls of the crib for permitting air circulation therethrough;

Figure 4 is a detail sectional plan view on the line 4—4 of Figure 3, showing the novel construction of the hopper bottom;

Figure 5 is a detail sectional view on the line 5—5 of Figure 1, showing the preferred manner of securing together the louvred plates which form the walls of the crib;

Figure 6 is a detail sectional view substantially on the line 6—6 of Figure 3, showing the means for securing the roof to the side walls of the crib;

Figure 7 is a detail sectional view on the line 7—7 of Figure 6; and

Figure 8 is a detail sectional view on the line 8—8 of Figure 3, showing the means provided in the doorway for preventing the corn or contents of the crib from discharging therethrough, when the door is opened.

The novel corncrib, herein disclosed, is shown comprising a suitable supporting structure or frame comprising upright corner posts 1 and side posts 2. These posts are secured together by suitable longitudinally extending side frame members 3, 4, 5, and 6. Suitable sheet metal plates 7 are secured to the side frame members 3, 4, and 5, and upright members 8 are provided at the joints between the plates, as illustrated in Figure 1. To facilitate manufacture, the sheets 7 are preferably arranged in upright relation.

The upright members 8 are preferably U-shaped in cross-section, as best shown at the left hand side of Figure 5, and the marginal edges of the plates 7, upon which the frame members 8 are seated, are preferably provided with outwardly turned flanges 9 which are received within the posts or members 8. A strap-like bar 11 is fitted over the marginal edges of the side plates 7 within the crib, and are secured in position by bolts 12, which pass through alined apertures provided in the posts 8 and straps 11. The marginal edges of the wall plates 7 are thus clamped in position between the posts 8 and straps 11, thereby allowing for free expansion and contraction of the structure at these joints in a horizontal direction. The marginal edge portions of the wall plates 7, which are secured to the upright posts 1 and 2 are substantially flat, as shown at the right hand side of Figure 5, and are clamped to said posts by straps 13 and clamping bolts 14.

The side walls of the crib are supported by suitable transverse frame members 15, 16, and 17, having their ends suitably secured to the corner posts 1 of the supporting frame.

The end walls of the crib are constructed in a manner similar to the side walls and each comprises a plurality of upright channel members 18 and 19, disposed over the joints between sheets, in a manner similar to the channel members 8. The members 18 at each end of the crib, extend upwardly from the lower frame members 17 and have arch-shaped roof-supporting members 20 secured to the upper ends thereof. These arch-shaped members have their terminals suitably secured to the upper ends of the corner posts 1 of the structure. The intermediate channel members 19 have their upper ends secured to the arches 20 and their lower ends to the cross members 16, as best shown in Figure 3.

The side walls are rigidly braced together by suitable diagonal braces 21 having their ends secured to the side frame members 3 and 4, as best shown in Figure 3. From the foregoing, it will be noted that a very rigid and substantial frame structure is provided.

A feature of the invention resides in the novel construction of the roof which preferably is constructed of corrugated metal sheets, having the corrugations running crosswise of the roof, as shown in Figure 1, so as to stiffen and strengthen the roof. By thus corrugating the roof plates, the roof may be constructed without the use of rafters or other intermediate supporting frame elements, with a resultant reduction in cost. The roof plates extend transversely of the roof and each is preferably made long enough to extend from side to side of the structure, whereby, when the ends of said plates are secured to the upper side frame members 3, as best illustrated in Figures 6 and 7, the roof becomes very rigid. The transversely disposed roof plates have their contiguous edges overlapped and suitably secured together by bolts or rivets 30, to prevent moisture from entering therebetween. While I have herein referred to the roof as being constructed of corrugated sheet metal, I do not wish to be so limited, as in some instances, it might be found more desirable to use flat, uncorrugated sheets. For all practical purposes, however, corrugated sheets seem to be preferable.

The roof plates are secured to the upper longitudinally extending frame members 3 by suitable brackets 22, shown secured to the roof plates by bolts 23. The brackets 22 have horizontal portions 24 seated upon the upper horizontally disposed flanges of the side frame members 3. The brackets 22 also preferably have downwardly extending portions 25 which engage the inner faces of the vertical flanges of the frame members 3, as shown in Figure 6, thereby to prevent the lower portion of the roof from spreading. To hold the brackets 22 firmly against the frame members 3, suitable hook bolts 26 are provided, the upper ends of which are engaged with loops 27 secured to the roof plates. The lower ends of the bolts 26 are engaged with hook brackets 28, shown fitted over the lower edges of the vertical flanges of the side frame members 3, as best illustrated in Figure 7. By this arrangement, the brackets 22 may be drawn firmly against the side frame members 3, whereby a very rigid and substantial roof structure is provided without the use of a supporting frame, with the exception, of course, of the arch-shaped end frame members 20 and the upper side frame members 3.

Suitable ventilators 29 are provided in the roof of the crib to permit air to circulate freely from the interior of the crib. The number of these ventilators may vary, depending upon the size and length of the crib. Suitable slide doors, generally indicated by the numeral 31, are also provided in the roof of the structure to facilitate loading the crib from the top. In the drawings, I have shown these doors located adjacent the lower side portions of the roof, but it is to be understood that they may be located at the extreme top of the roof, or in any other location, where desired. Suitable loading doors 32 are also provided in the upper portions of the side walls of the crib, as shown in Figure 1, to facilitate loading the crib at these points.

Another feature of the invention resides in the novel construction of the bottom of the crib, whereby the operation of unloading the crib is greatly facilitated, regardless of whether the crib is partially or completely filled. As best shown in Figures 3 and 4, the bottom of the crib is in the form of a hopper and comprises inclined side walls 33, having their uppermost portions secured to and supported by the side frame members 5 of the side walls. The lower portions of the hopper walls 33 are spaced apart, as shown, to provide an elongated discharge opening 34, which preferably extends from end to end of the crib. This discharge opening is defined by spaced apart longitudinally extending rails 35 secured to the lower end frame members 17, as best shown in Figure 3. The rails 35 may be in the form of angle irons, and are preferably arranged as shown in Figure 3, to provide upwardly extending flanges 36 which cooperate to provide supporting rails for a plurality of perforated slide doors, generally indicated by the numeral 37. These slide doors provide means for closing the elongated discharge opening 34 to prevent the corn or contents of the crib from discharging therethrough.

The side walls 33 of the hopper bottom are made of perforated material and I have found that a very practical and efficient material to use for this purpose, is a fabricated material, known to the trade as a chain link wire mesh, in which the mesh is sufficiently small to prevent rodents, such as mice and rats, from gaining entrance to the interior of the crib through the bottom thereof. This wire mesh is suitably supported between the side frame members 5 and the lower rails 35 by suitable inclined supporting members 38, which are spaced apart lengthwise of the crib in such a manner as to adequately support the inclined hopper walls 33, when the crib is completely loaded or filled.

In some instances it may be deemed more desirable to use expanded metal or perforated metal sheets for the side walls 33, as a substitute for the wire mesh, and I therefore wish to have it understood that the invention, in its broadest aspects, is intended to cover any material which may be practically used to provide a well ventilated hopper bottom.

Another feature of the invention resides in the unique construction of the door openings 39 provided in the ends of the crib. These door openings are normally closed by suitable doors 41, to prevent the elements from entering through these door openings. To prevent the contents of the crib from discharging through the door openings 39, when the doors are opened, a plurality of slats 42, preferably of metal, are removably supported in suitable inclined guides provided in the jambs of the door openings. These slats are so spaced apart and disposed at such an angle that when the doors are opened, the corn cannot discharge through said openings. The slats are removably supported whereby they may readily be removed to permit the corn to discharge from the crib through the openings, when desired.

The novel crib, herein disclosed, may be loaded in any suitable manner, well known to the trade. To unload the crib or remove some of the contents therefrom, one of the doors 41 is preferably opened, and two or more of the lower slats 42 are then removed from the doorway, whereby access may readily be had to the adjacent end slide door 37. The slide door 37 adjacent the door opening is then withdrawn, as illustrated in Figure 4, whereby the corn will discharge through the open portion of the elongated opening in the hopper bottom, onto the ground, or onto any suitable receiving means, such as a conveyor, not shown, which may be arranged beneath said opening. The bottom of the crib is spaced a sufficient distance from the ground to permit a suitable conveyor to be placed beneath the discharge opening 34, as above stated.

To discharge or remove corn from the crib, one of the slide doors 37 at one end of the crib is pulled outwardly, as shown in Figure 4, or it may be completely removed from the crib, if desired. When a portion of the corn at the end of the crib has been discharged through the opening 34, the next slide 37 is moved forwardly toward the door opening, whereby the discharge opening 34 is, in effect, moved inwardly beneath the corn or contents of the crib. By thus successively moving the slide doors 37 forwardly, as the corn discharges from the crib, all of the contents may readily be removed therefrom by manipulation of the slide doors 37, which greatly facilitates the operation of unloading the crib.

By constructing the crib, as herein disclosed, free circulation of air is permitted throughout the entire contents of the crib. The wire mesh walls of the hopper bottom permit maximum air circulation therethrough, which is desirable because the corn is usually packed more densely in the bottom of the crib than in the upper portion thereof. The slide doors 37 are also perforated so as to provide ample air circulation therethrough. The louvres provided in the side and end walls of the crib are spaced relatively close together and because of their inherent construction, prevent snow and rain from entering the crib in sufficient amounts to, in any way, damage the corn. It will also be noted that the entire structure is rodent-proof, whereby corn or other grain may be sored in the crib for long periods without the slightest danger of becoming destroyed by rats or mice, as is common with a great many well-known cribs.

The entire structure is self-contained and is sufficiently braced to permit it to be readily moved about from place to place without danger of damaging or distorting the crib.

In the drawings I have shown the side and end walls as being perforated or louvered, to permit air circulation therethrough. This is a desirable feature, but is not absolutely essential. If the hopper bottom is well ventilated, and the roof is provided with suitable ventilators, it is possible to obtain sufficient air circulation through the crib to adequately dry the corn and prevent it from heating and molding. Two or more of the crib walls are preferably perforated, however, as it tends to induce more rapid air circulation through the crib, particularly when the crib is well filled.

In the drawings, particularly in Figure 1, I have shown two upright frame members 8 disposed between the upright supporting posts 1 and 2 of the side walls. It is to be understood that, if desired, the upright supporting posts 2 may be spaced relatively closer together to allow but one member 8 between adjacent posts 2. The number of loading doors and ventilators may also be varied, depending upon the length and size of the crib. A door 41 is preferably provided at each end of the crib, whereby the contents may be discharged from the crib from either end thereof. It is also to be noted that the crib is constructed entirely of metal, which is properly weather-proofed to prevent deterioration thereof, whereby the cost of maintaining the structure is greatly minimized.

I claim as my invention:

1. A grain crib comprising a plurality of substantially vertical walls of sheet metal fastened together to form an enclosed crib space, said walls being formed with ventilating openings, a roof over the crib space defined by the walls, and a bottom for said crib space extending inwardly at a substantial angle with respect to opposite side walls and downwardly therefrom to a position below said side walls so as to be exposed to side winds impinging against the crib, said bottom having ventilating openings therein substantially throughout the extent of the bottom for the passage of air upwardly therethrough, and a ventilating opening in the top of said crib.

2. A grain crib comprising a frame, substantially vertical walls set together on said frame so as to enclose a crib space of substantially rectangular plan, said walls being formed with ventilating openings and the bottom edges of opposed side walls being above ground level, a roof mounted on the frame for covering said crib space, said roof being formed with a ventilating opening therein for the outflow of air flowing upwardly through the crib, and a bottom for said crib space composed of a plurality of bottom members having ventilating openings substantially throughout the extent thereof, said bottom members extending inwardly at a substantial angle with respect to opposite side walls and downwardly therefrom to a position below said side walls so as to be exposed to side winds impinging against the crib, and means joining the adjacent lower edges of said bottom members.

3. A grain crib comprising a frame, substantially vertical walls set together on said frame so as to enclose a crib space of substantially rectangular plan, said walls being formed with ventilating openings and the bottom edges of opposed side walls being above ground level, a roof mounted on the frame for covering said crib space, said roof being formed with a ventilating opening therein for the outflow of air flowing upwardly through the crib, and a bottom for said crib space composed of a plurality of bottom members having ventilating openings substantially throughout the extent thereof, said bottom members extending inwardly at a substantial angle with respect to opposite side walls and downwardly therefrom to a position below said side walls so as to be exposed to side winds impinging against the crib, the bottom members extending downwardly from opposite sides being spaced apart at their lowermost edges to form a discharge opening, and a closure plate removably positioned across said opening for closing said opening.

4. A grain crib comprising a frame, substantially vertical walls set together on said frame so as to enclose a crib space of substantially rectangular plan, said walls being formed with ventilating openings and the bottom edges of opposed side walls being above ground level, a roof mounted on the frame for covering said crib space, said roof being formed with a ventilating opening therein for the outflow of air flowing upwardly through the crib, and a bottom for said crib space composed of a plurality of bottom members having ventilating openings substantially throughout the extent thereof, said bottom members extending inwardly at a substantial angle with respect to opposite side walls and downwardly therefrom to a position below said side walls so as to be exposed to side winds impinging against the crib, the bottom members extending downwardly from opposite sides being spaced apart at their lowermost edges to form a discharge opening lengthwise of the crib intermediate said side walls, closure plates mounted for endwise movement along said openings, and a door in one of the vertical walls of the crib aligned with said opening.

5. A grain crib comprising a frame, substantially vertical walls set together on said frame so as to enclose a crib space of substantially rectangular plan, said walls being formed with ventilating openings and the bottom edges of opposed side walls being above ground level, a roof mounted on the frame for covering said crib space, said roof being formed with a ventilating opening therein for the outflow of air flowing upwardly through the crib, and a bottom for said crib composed of a plurality of wire fabric members, said bottom members extending inwardly at a substantial angle with respect to opposite side walls of the crib and downwardly therefrom to a position below said side walls so as to be exposed to side winds impinging against the crib, and means joining adjacent lower edges of said bottom members.

JAMES COWIN.